Figure 1:
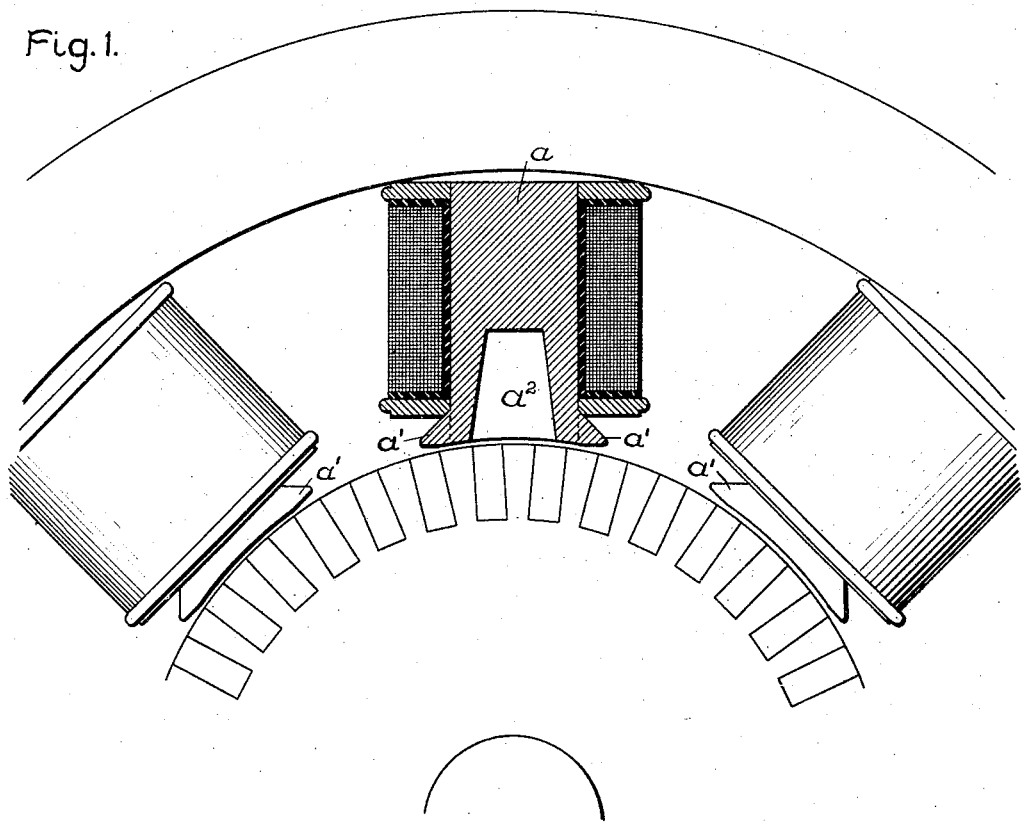

A. CHURCHWARD.
POLE PIECE FOR DYNAMO ELECTRIC MACHINES.
APPLICATION FILED AUG. 23, 1901.

907,738.

Patented Dec. 29, 1908.

Witnesses.
Ewing R. Gurney.
Benjamin B. Hull.

Inventor.
Alexander Churchward.
by Albert G. Davis
Atty.

UNITED STATES PATENT OFFICE.

ALEXANDER CHURCHWARD, OF CHICAGO, ILLINOIS, ASSIGNOR TO GENERAL ELECTRIC COMPANY, A CORPORATION OF NEW YORK.

POLE-PIECE FOR DYNAMO-ELECTRIC MACHINES.

No. 907,738.     Specification of Letters Patent.     Patented Dec. 29, 1908.

Application filed August 23, 1901. Serial No. 73,050.

*To all whom it may concern:*

Be it known that I, ALEXANDER CHURCHWARD, a citizen of the United States, residing at Chicago, county of Cook, State of Illinois, have invented certain new and useful Improvements in Pole - Pieces for Dynamo-Electric Machines, of which the following is a specification.

This invention relates to dynamo electric machines, and its object is to provide a pole-piece which will automatically compensate for changes in load.

Heretofore it has been the practice to so design the pole-pieces that the pole-tips, whether part of the pole itself or in the form of a shoe attached to said pole-piece, are worked high up on the saturation curve, while the center of the pole-face is worked at a comparatively low saturation.

In general, if the cross magnetization of the armature is small, compared with the direct flux from the field, this method is very successful. But in a case where the fluctuations in load are great, such as in railway generators, and where it is necessary that the brushes remain in a fixed position under all loads, it is apparent that a very different flux is necessary to reverse the current in the armature wires without sparking, as the loads vary. For instance, if the brushes are so set as to cause no sparking at no load, then when the heavy overloads come on, even if only momentarily, there will be considerable sparking. On the other hand, if the brushes are set far enough forward to give a sparkless collection at full load or on the overloads, the machine will spark badly at no load.

My invention aims to overcome all this trouble by so constructing the pole-pieces that the tips will be less saturated than the center of the pole-face, or in other words, reversing the usual conditions of magnetization. Then, as the load increases and more flux is needed the shortest and easiest path for the lines of force will be through the pole-tips, so that as the load increases, the reversing field will increase in proportion to the load. Moreover, in case a circuit-breaker opens on an overload, there will be no tendency for the machine to spark, as the flux which the coil under the brush is cutting, will be reduced the instant the circuit-breaker cuts off the current from the machine.

My invention is also useful in rotary converters and in alternating current generators, as it tends to keep the flux evenly distributed on the pole-face, which results in better regulation.

The invention therefore consists in a pole-piece having a portion of its face removed at the center in order to produce a higher degree of saturation there than at the pole-tips when the machine is running at no load or with a light load. This removal is most conveniently effected by cutting out the middle portion of the end of every other lamination, so that the pole-piece will have a plurality of deep narrow parallel recesses extending in from the middle of the pole-face, and preferably tapering from the outside inwards.

Figure 2:
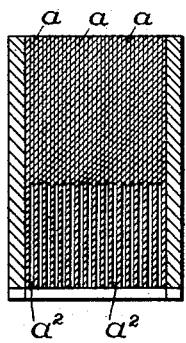

In the accompanying drawing, Figure 1 is a side elevation of a multipolar machine, showing also a longitudinal section of a pole-piece embodying my invention, taken on a plane of rotation of a coöperating armature. Fig. 2 is a longitudinal section of a single pole-piece in a plane at right angles to Fig. 1.

The pole-piece is shown as built up of laminæ $a$, which may be provided with tips $a'$, if desired, either integral with the laminæ, or in the form of a pole-shoe, as indicated by the dotted lines in Fig. 1. The laminæ in the middle are alternately cut away as shown in Fig. 1, the notch or recess $a^2$ being preferably somewhat tapering as shown.

The result is that the middle portion of the pole-face presents a smaller surface of metal to the armature than to the tips, so that the middle of the laminations become saturated before the pole-tips do, and thus any increase in the flux is forced to flow through the tips. This "stiffens" the field at the tips on an increase of load, and avoids the necessity of any change in the position of the brushes. The size of the notches $a^2$ must be such as to properly proportion the saturation of the two parts of the pole-piece to produce the right change in flux at the pole-tips as the load varies.

What I claim as new and desire to secure by Letters Patent of the United States, is—

1. A laminated pole-piece for dynamo-electric machines, having the middle portion of alternate laminæ cut away.

2. A pole-piece for dynamo-electric machines composed of laminæ, a portion of which are notched in the middle of one end to increase the magnetic reluctance at the middle of the pole-face, the other laminæ being solid.

3. A pole-piece for dynamo-electric machines composed of laminæ, some of which extend to the pole-face across their entire width, while the others extend thereto only at the tips, thereby increasing the magnetic reluctance at the middle of the pole-face.

In witness whereof, I have hereunto set my hand this 19th day of August, 1901.

ALEXANDER CHURCHWARD.

Witnesses:
BENJAMIN B. HULL,
J. SCRIBNER.